United States Patent [19]

Gajewski et al.

[11] 4,210,686

[45] Jul. 1, 1980

[54] MULTI-LAYERED PLASTIC SHEETING HAVING HIGH CLARITY, STRENGTH, AND RESISTANCE TO WATER VAPOR TRANSMISSION

[75] Inventors: Henry Gajewski, Winnetka; Dean G. Laurin, Lake Zurich; Paul Measells, Libertyville; R. Daniel Webster, Wauconda, all of Ill.

[73] Assignee: Baxter Travenol Laboratories, Inc., Deerfield, Ill.

[21] Appl. No.: 917,122

[22] Filed: Jun. 19, 1978

[51] Int. Cl.$^2$ .................... B32B 1/02; B65D 65/38
[52] U.S. Cl. ............................ 428/35; 428/215; 428/332; 428/516; 525/95
[58] Field of Search ............... 428/35, 576, 215; 525/95; 428/332

[56] References Cited

U.S. PATENT DOCUMENTS

| | | | |
|---|---|---|---|
| 3,424,649 | 1/1969 | Nyberg et al. | 428/516 X |
| 3,480,696 | 11/1969 | Hassell et al. | 525/95 |
| 3,496,061 | 2/1970 | Freshour et al. | 428/516 X |
| 3,589,976 | 6/1971 | Erb | 428/516 X |
| 3,904,470 | 9/1975 | Fukuki et al. | 428/516 X |
| 4,140,162 | 2/1979 | Gajewski et al. | 525/95 |

*Primary Examiner*—Paul J. Thibodeau
*Attorney, Agent, or Firm*—Paul C. Flattery; John P. Kirby, Jr.; Garrettson Ellis

[57] ABSTRACT

A multiple-layered, autoclavable, flexible plastic sheet comprises (a) at least one first layer consisting essentially of 30 to 90 percent by weight of a block copolymer having thermoplastic rubbery characteristics and having rubbery olefin blocks and blocks of a polystyrene; and from 10 to 70 percent by weight of a polyolefin derived principally from at least one of propylene, ethylene and 4-methylpentene-1, said polyolefin having a Vicat Softening Temperature of about 120° C.; and (b) at least one second layer consisting essentially of a polyolefin derived principally by from at least one of propylene, ethylene, and 4-methylpentene-1 and being of semi-crystalline characteristics to exhibit low permeability to water vapor, the first and second layers being bonded together in alternating arrangement.

21 Claims, No Drawings

MULTI-LAYERED PLASTIC SHEETING HAVING HIGH CLARITY, STRENGTH, AND RESISTANCE TO WATER VAPOR TRANSMISSION

BACKGROUND OF THE INVENTION

Parenteral solutions and other liquids are currently packaged in flexible, collapsible plastic containers made out of heat-sealed sheeting.

Such materials, especially when used to package medical solutions, are desirably transparent and easily heat-sealable, and also must be free of harmful materials which can leach into the medical solution. Certain materials such as medical grade polyvinyl chloride formulations, while otherwise satisfactory, exhibit an undesirably high tendency to permit the diffusion of water vapor through the container, which results in a loss of water from the medical solution.

As one response to this, polyvinyl chloride bags for parenteral solutions have been packaged in a sealed overpouch of a polyisobutylene-modified high density polyethylene compound made from a commercially available formulation. While this material has excellent water vapor barrier characteristics, it has other characteristics which are short of optimum, in that it is less optically clear than would be desirable, and is somewhat subject to the formation of pinholes due to a relatively low flex resistance, among other properties.

In accordance with this invention, a laminated plastic formulation is provided which exhibits significant improvements in the characteristics most desirable for the packaging of parenteral solutions, either as an overpouch for a solution bag made of polyvinyl chloride or the like, or as the solution bag itself.

The formulation of this invention exhibits improved clarity over rubber-modified polyethylene even at greater thicknesses, and also provides improved seal strength and better flex resistance to reduce pinholes. Furthermore, the laminated material of this invention exhibits improved processability over various prior art formulations as well as its own polymeric ingredients in pure form.

DESCRIPTION OF THE INVENTION

In accordance with this invention, a multiple-layered autoclavable, flexible plastic sheet is provided which comprises (a) at least one first layer consisting essentially of 30 to 90 percent by weight of a block copolymer having thermoplastic rubbery characteristics and having rubbery olefin blocks and blocks of a polystyrene; and from 10 to 70 percent by weight of a polyolefin derived principally from at least one of propylene, ethylene, and 4-methylpentene-1, said polyolefin having a Vicat Softening Temperature of above 120° C. (as determined according to ASTM D1525); and (b) at least one second layer consisting essentially of a polyolefin derived principally from at least one of propylene, ethylene, and 4-methylpentene-1, and being of semi-crystalline characteristic to exhibit low permeability to water vapor, i.e., having enough crystallinity to exhibit a water vapor barrier capacity at least equal to medium density polyethylene (defined below), the first and second layers being bonded together in alternating arrangement in the case when multiple first or second layers are present.

The above plastic sheet may either comprise a single first layer (a) bonded to second layer (b) typically by coextrusion, or the plastic sheet may comprise a pair of first layers (a) bonded to both sides of a second layer (b) or, alternatively, a pair of second layers (b) bonded to both sides of a first layer (a). Also, laminates of two or more of each of layers (a) and (b) in alternating arrangement may be used.

The above-described autoclavable plastic sheet provides the desired low permeability to water vapor which is generally provided by the second layer (b), coupled with added strength and particularly flex resistance resulting in fewer pinholes in production runs, which is provided by layer (a). Also, coextrusions of the materials of this invention are usually easier to extrude than a pure layer of the above-described block copolymer having thermoplastic, rubbery characteristics, with the other polyolefin ingredients serving as a lubricant to relieve shear stress.

Also, surprisingly, it has been found that the addition of first layer (a) in lamination with second layer (b) causes an improvement in optical clarity, so that the clarity of the resulting plastic often exceeds the clarity of the very same layer (b), had the first layer (a) not been applied.

The block copolymers having thermoplastic rubbery characteristics described above are commercially available under the trademark KRATON from the Shell Chemical Company or SOLPRENE from the Phillips Petroleum Company. The rubbery polyolefin block utilized herein is preferably poly(ethylene-butylene), particularly those copolymers with approximately equal amounts of the respective two copolymer units. However, other useful commercially available materials having a central rubbery polyolefin block of butadiene or isoprene may also be used in this invention.

Mixtures of the above described block copolymers of differing molecular weight may also be desirable for use. An advantage of such mixtures is that a component of the mixture may include the block copolymer as described above with the molecular weight which is in itself too high to permit extrusion, with the extrudability being facilitated by a component of lower molecular weight block copolymer to obtain an advantage in physical properties from the high molecular weight component.

The block copolymer materials preferably used herein have a Brookfield viscosity of 10 to 2000 cps. as a 10 weight percent toluene solution, measured at 25° C. for the purposes of this invention. These materials exhibit the characteristics of a thermoplastic rubber, due to the combined effects of the central blocks of the molecule, which typically are rubbery polyolefin material, and the terminal blocks of the thermoplastic polystyrene.

Preferably, in the block copolymer described above, the central block of poly(ethylene-butylene) units may comprise 60 to 85 percent by weight of the copolymer molecule, while the terminal blocks of polystyrene or equivalent material comprise the balance of the compound.

The rigid, usually terminal blocks of the block copolymer having thermoplastic rubbery characteristics customarily consist of polystyrene, although it is contemplated that derivatives of polystyrene and other equivalent materials can be used as well.

The polyolefin is used in ingredient (a) to increase the heat distortion temperature of the resulting formulation, since it is generally desirable for the material of this invention to withstand autoclaving temperatures.

The polyolefin component of ingredient (a) of the first layer, as well as the polyolefin component of the second layer (b) may each or both include minor amounts of other olefin polymer units as may be desired, for example, butadiene, isoprene, isobutylene, 1-butene, 1-hexene, or the like, as well as small amounts of cross-linking units, such as divinylbenzene, vinylcyclohexene, or 1,5 hexadiene to increase the molecular weight of the resulting material. In particular, the second layer may comprise a high density polyethylene formulation to contain from 20 to 40 percent by weight of polyisobutylene rubber to toughen and soften the high density polyethylene.

The term "high density polyethylene" is intended to define polyethylene formulations which have a density of 0.95 g/cc. or more.

"Medium density polyethylene" is defined herein to have a density of 0.935 up to but not including 0.95 g/cc.

For example, the first layer may consist essentially of 75 to 85 percent by weight of the block copolymer having thermoplastic rubbery characteristics, in which the rubbery olefin blocks of the block copolymer are copolymers of ethylene and butylene in preferably generally equal proportions, and the block copolymer is in intimate mixture with from 15 to 25 percent by weight of a polypropylene containing a minor amount of ethylene units. The second layer then may comprise medium density polyethylene on one or both sides of the first layer.

Also, if desired, the polyolefin components of both the first and second layers may include copolymers of ethylene containing up to about 35 percent by weight of vinyl acetate units, with the copolymers of ethylene having a melt flow index (ASTM D1238, Condition E) of 0.1 to 50.

The following examples are provided for illustrative purposes only and are not for the purpose of limiting the invention of this application, which is as defined in the claims below.

EXAMPLE 1

An elastoplastic compound (called compound A) was prepared by mixing and pelletizing, in a typical plasticizing screw extruder, a formulation comprising the following: (1) 80 weight percent of a block copolymer (KRATON G-1662) having thermoplastic rubber characteristics, with a central block of ethylene and butylene copolymer units in generally equal molar proportions, and terminal blocks of polystyrene, in which the poly(ethylene-butylene) portion of the copolymer comprises about 70 percent by weight of the copolymer molecule, and the material has a Brookfield viscosity at 25° C. of 20 cps., using a ten weight percent solution in toluene, and containing from 0.03 to 0.07 percent by weight of AO330 antioxidant (sold by the Ethyl Corporation). The material also has a solution viscosity of 550 cps. as a 20 weight solution in toluene at 77° F.

Mixed with the above was 20 percent by weight of a polypropylene material containing a few percent of ethylene units and having a density of 0.895 g/cc. and a melt flow rate of 2.0 (ASTM D1238 Condition L). This material is commercially available from the Rexene Polymers Company as REXENE 23M2.

The resulting plastic composition is transparent, flexible, tough, and may be fabricated by conventional extrusion and injection molding equipment.

The above formulation was coextruded as a bilayer film with a medium density polyethylene material (sold by the Chemplex Company as CX5402) having a density of 0.941 g/cc and a melt flow index of 0.2 (ASTM D1238 Condition E) in a conventional manner to form a blown film bilayer composite tube comprising two nearly equal thickness (0.004 to 0.01 inch) layers of the two plastic formulations.

After extrusion, the two plastic formulations were found to be very strongly welded together in the bilayer composite film, having excellent contact clarity and flexibility. The contact clarity of the material is improved over the corresponding film made of the CX5402 polyethylene.

The above film is easily heat-sealed, with the polyethylene sides on the inside, to form bags. The bags were filled with water and completely sealed, and then were steam sterilized in an autoclave at 250° F., after which they were found to be free of excessive distortion, without loss of the other desirable properties.

The above described film also exhibited outstanding toughness when compared with a single layer film of polyisobutylene-modified high density polyethylene as indicated by the Gelbo flex test (ASTM F392-74). Also, the bags exhibited higher burst strength and seal integrity when compared with equivalent bags made only of the CX5402 polyethylene, while at the same time exhibiting the equivalent and desirable low water vapor transmission rates (ASTM E96).

EXAMPLE 2

A cyclohexane solution containing ten percent by weight of the following formulation was prepared: (a) 70 percent by weight of a block copolymer (KRATON G1650), having thermoplastic rubbery characteristics, with a central block of ethylene and butylene copolymer units in equimolar portions, and terminal blocks of polystyrene, the material having a Brookfield viscosity of 60 cps. at 10 weight percent in toluene at 25° C., and (b) 30 weight percent of the polypropylene copolymer described in Example 1 (Rexene 23M2).

Into this mixture was dipped an extrusion-blown film of approximately 0.005 inch thickness, made of an about 30 weight percent polyisobutylene rubber-modified high density polyethylene (PAXON 3204 of the Allied Chemical Company). After dipping of both sides of the extrusion-blown film into the solution, the film was withdrawn and allowed to air-dry thoroughly.

The resultant material was a multiple-layered, autoclavable, flexible plastic sheet having a polyolefin second layer covered on each side with layers of the block copolymer-polypropylene formulation initially added to the cyclohexane solution. The resulting film was found to be more transparent than the uncoated rubber-modified, high density polyethylene film by itself. Layers of the plastic film were heat-sealed together and found to be inseparable by many rapid cycles of wrinkling, or by stretching to the breaking point. Furthermore, the composite film remained very flexible and showed improved strength compared with the uncoated, rubber-modified, high density polyethylene film.

The film also was capable of autoclaving at 250° F. without significant loss of clarity or strength of heat-sealed bond to itself, and also without excessive distortion or sticking together.

EXAMPLE 3

An elastoplastic compound similar to compound A of Example 1 was prepared with the exception that 0.5 weight percent of a hydrogel silica powder (Silcron G100, Glidden Pigments Division, SCM Corp.) and 0.5 weight percent of a fatty acid amide material (KEMAMIDE E, Humko Chemical Division of Kraft Co.) were added, these two additives having the capability of reducing surface friction of the resulting material.

Pellets of the resulting composition were then placed in an extruder, and coextruded as a blown film tube with the medium density polyethylene layer as described in Example 1.

Once again, excellent adhesion occurred between the two layers of plastic in the compounds of film, which film exhibited a substantially reduced friction against itself and other materials, such as flexible polyvinyl chloride plastic and corrugated cardboard box walls.

The film was heat-sealed with the polyethylene on the inside to form bags filled with water, which were then autoclaved at 250° F. The bags remained well sealed through the autoclaving process, and after cooling retained the low friction characteristic of the material prior to autoclaving. The addition of slip and anti-block agents to the tough elastic layer did not adversely affect its sealability and seal strength obtained between the polyethylene sides of the composite film, nor did it significantly diminish the Gelbo flex toughness (ASTM F392-74) or the improved clarity of the material before or after autoclaving.

EXAMPLE 4

The following mixture was extrusion blended in a manner similar to that of Example 1: 40 percent by weight of the polyisobutylene-modified high density polyethylene compound of Example 2 (PAXON 3204) and 60 percent by weight of the block copolymer of poly(ethylene-butylene) units and polystyrene units as described in Example 1. The reslulting formulation was pelletized and placed in an extruder for extrusion as a 0.004 to 0.01 inch thick film in lamination with a coextruded film of generally equal thickness of the polyisobutylene-modified polyethylene material (PAXON 3204).

The resulting coextruded film was prepared in the manner similar to Example 1 to provide a film of significantly improved thickness and substantially improved transparency compared with a single layer of film of the same polyisobutylene-modified polyethylene compound. The water vapor transmission rate, on the other hand, of the bilayer film is essentially equal (ASTM E96) to the water transmission rate of the polyisobutylene-modified polyethylene film.

The film was fabricated into a bag and filled with water and heat-sealed by an impulse technique with the polyisobutylene-modified polyethylene layer on the inside of the bag. The bags were steam-sterilized in a conventional autoclave at 250° F. without excessive distortion or adhesion together of the films. Also, the heat seals of the film remain suitably strong for practical use as a packaging container.

EXAMPLE 5

Pellets of a mixture of the following were prepared by extrusion mixing: (a) 60 percent by weight of the KRATON G1650 block copolymer described in Example 2; (b) 20 percent by weight of a copolymer derived from approximately 75 weight percent of ethylene and 25 percent of vinyl acetate (ALATHON 3190 of DuPont), having a melt index of 2 (ASTM D1238 Condition E); and (c) 20 percent by weight of the Rexene 23M2 polypropylene described in Example 1.

This mixture of materials is a flexible, tough plastic which has good transparency as film less than about 0.025 inch thick.

The above described plastic material was then coextruded into a double layer film with the polyisobutylene-modified high density polyethylene (PAXON 3204 as described in Example 2) using the conventional blown-film extrusion method of the previous examples, to form a bilayer film with each material being strongly bonded to the other, and each layer being of generally equal thickness, (i.e., 0.004 to 0.01 inch).

This composite film was more clear than a blown film of the polyisobutylene rubber-modified polyethylene alone. Also, bags of water fabricated by heat-sealing the bilayer film with a polyethylene layer positioned inside of the bag were capable of autoclaving at 250° F. without excessive distortion, loss of clarity, blocking together on contact with themselves, and without failure of the bag seals. A water vapor transmission rate through the bilayer film was desirably low, and the film had good contact clarity, although less so than the film of Example 1.

EXAMPLE 6

A mixture was prepared of 65 percent by weight of the KRATON G1650 block copolymer described in Example 2, and 35 percent by weight of poly (4-methylpentene-1) (TPX RT-18, sold by the Mitsui Company). This material exhibited a melt flow rate of 26 g/10 min. in accordance with ASTM 1238 at 260° C. with a five kilogram load and a four gram sample, the test relating to the flow rate of the sample through an orifice.

This mixture was processed in a Brabender Plasticorder device at an oil bath temperature of 250° C. and was capable of forming a strong transparent, autoclavable sheet having a thickness of 0.005 to 0.01 inch.

When a sheet of the above described material is laminated, for example, to a sheet of medium density polyethylene by coextrusion or other conventional methods, the laminated sheet has properties generally similar to the laminated sheets of the previous examples.

EXAMPLE 7

A three layer coextrusion die was adapted to produce extruded tri-layer film. The first extruded layer was a polyethylene formulation (Chemplex CX-5927, having a density of 0.942 and a melt index of about 0.4 under ASTM D-1238, Condition E). The extruded layer was from 0.0001 to 0.001 inch thick, i.e., sufficient only to assure complete coverage of the surface to provide lower friction and improved scuff resistance.

The second, inner extruded layer was made of the compound A formulation described in Example 1, extruded to a thickness of 0.001 to 0.003 inch in bonding contact with the first layer.

The third, extruded outer layer of film was made of the same polyethylene material as the first layer (Chemplex CX-5927) but extruded to a thickness so that the combined thickness of both the first and third polyethylene layers is at least 0.003 inch, and preferably no more than 0.01 inch, although in some circumstances a total of up to about 0.03 inch thickness of the polyethylene may be used. For instance, the first polyethylene layer may be 0.005 inch thick and the third polyethylene layer may be 0.03 inch thick. It is believed that the flex modulus of the resulting film will be lowered when the majority of the polyethylene material is positioned on one side of the three layer laminate.

The third layer is also coextruded in contact with the second layer of compound A to provide good adhesion, the extrusion temperature of the die being preferably about 480° to 520° F..

The extruded tri-layer film is cast out of the extruder onto a chrome-plated, water-cooled calendering roll to cool rapidly, which results in a uniform, glossy surfaced film of improved transparency, toughness, and burst-strength, and sealed seal integrity when the film is formed into bags. At the same time, desirably low water vapor transmission rates are exhibited by the material.

EXAMPLE 8

Generally equivalent results are obtained when the three layer extrusion of Example 7 is repeated using a polypropylene formulation for the first and third extruded layers, for example, Crown Zellerbach Crown-film 112 (density 0.086).

That which is claimed is:

1. A mutliple-layered, autoclavable, flexible plastic sheet which comprises: (a) at least one first layer consisting essentially of 30 to 90 percent by weight of a block copolymer having thermoplastic, rubbery characteristics, and having rubbery polyolefin blocks consisting essentially of ethylene and butylene units and blocks of a polystyrene; the rubber polyolefin blocks comprising from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.; and (b) at least one second layer consisting essentially of a polyolefin derived principally from at least one of propylene, ethylene, and 4-methylpentene-1, and being of semi-crystalline characteristic to exhibit low permeability to water vapor, said first and second layers being bonded together in alternating arrangement.

2. The flexible plastic sheet of claim 1 in which said second layer is a high density polyethylene formulated to contain from 20 to 40 percent by weight of polyisobutylene rubber.

3. The flexible plastic sheet of claim 1 in which said second layer consists essentially of medium density polyethylene.

4. The flexible plastic sheet of claim 1 in which said first layer consists essentially of 75 to 85 percent by weight of said block copolymer having thermoplastic rubbery characteristics in which said block copolymer is in intimate mixture with from 15 to 25 percent by weight of a polypropylene containing a minor amount of ethylene units; and said second layer comprises medium density polyethylene.

5. The flexible plastic sheet of claim 4 in which said block copolymer is terminated at the ends thereof with blocks of said polystyrene.

6. The flexible plastic sheet of claim 1 in which said polyolefin component includes copolymer of ethylene containing up to 35 percent by weight of vinyl acetate units, said copolymer of ethylene having a melt flow index (ASTM D1238 Condition E) of 0.1 to 50.

7. The flexible plastic sheet of claim 1 in which said first layer is overlaid on both sides by said second layers.

8. The flexible plastic sheet of claim 1 which comprises a single first layer bonded to a single second layer.

9. A flexible, autoclavable, multilayered plastic bag which comprises (a) a first, inner layer consisting essentially of 30 to 90 percent by weight of a block copolymer having thermoplastic, rubbery characteristics, having rubbery polyolefin blocks comprising ethylene and butylene units and blocks of a polystyrene, the rubbery polyolefin blocks consisting essentially of 60 to 85 percent by weight of said block copolymer; and from 10 to 70 percent by weight of a polyolefin, derived principally from at least one of propylene, ethylene, and 4-methylpentene-1, said polyolefin having a Vicat Softening Temperature of above 120° C.; (b) a second, inner layer, bonded to the inner surface of said first layer, consisting essentially of a polyolefin derived from principally at least one of propylene, ethylene and 4-methylenpentene-1, and being of semi-crystalline characteristic to exhibit low permeability to water vapor; and (c) an outer layer, bonded to the outer surface of said first layer, said outer layer being similar in composition to said second layer.

10. The flexible plastic bag of claim 9 in which said second layer is of high density polyethylene formulated to contain 20 to 40 percent by weight of polyisobutylene rubber.

11. The flexible plastic bag of claim 9 in which said second layer consists essentially of medium density polyethylene.

12. The flexible plastic bag of claim 9 in which said first layer consists essentially of 75 to 85 percent by weight of said block copolymer having thermoplastic rubbery characteristics said block copolymer is in intimate mixture with from 15 to 25 percent by weight of a polypropylene containing a minor amount of ethylene units; and said second layer comprises medium density polyethylene.

13. The flexible plastic bag of claim 9 in which said polyolefin component includes a copolymer of ethylene containing up to 35 percent by weight of vinyl acetate units, said copolymer of ethylene having a melt flow index of 0.1 to 50, as determined by ASTM D1238, Condition E.

14. The plastic bag of claim 9 in which said outer layer is from 0.0001 to 0.001 inch thick and said inner layer is of sufficient thickness whereby the total thickness of said inner and outer layers is at least 0.003 inch.

15. A plastic bag defining walls of a multi-layered plastic sheet which comprises (a) at least one first layer consisting essentially of 30 to 90 percent by weight of a block copolymer having thermoplastic, rubbery characteristics, and having rubbery polyolefin blocks comprising ethylene and butylene units and blocks of a polystyrene; the rubbery polyolefin blocks consisting essentially of from 60 to 85 percent by weight of said block copolymer; and from 10 to 70 percent by weight of a polyolefin derived principally from at least one of propylene, ethylene, and 4-methylpentene-1, said polyolefin having a Vicat Softening Temperature of above 120° C.; and (b) at least one second layer consisting essentially of a polyolefin derived principally from at least one of propylene, ethylene and 4-methylpentene-1, and being of semi-crystalline characteristics to exhibit low permeability to water vapor, said first and second layers being bonded together in alternating arrangement.

16. The flexible plastic bag of claim 15 in which said second layer is of high density polyethylene formulated to contain 20 to 40 percent by weight of polyisobutylene rubber.

17. The flexible plastic bag of claim 15 in which said second layer consists essentially of medium density polyethylene.

18. The flexible plastic bag of claim 15 in which said first layer consists essentially of 75 to 85 percent by weight of said block copolymer having thermoplastic rubbery characteristics said block copolymer is in intimate mixture with from 15 to 25 percent by weight of a polypropylene containing a minor amount of ethylene units; and said second layer comprises medium density polyethylene.

19. The flexible plastic bag of claim 15 in which said polyolefin component includes a copolymer of ethylene containing up to 35 percent by weight of vinyl acetate units, said copolymer of ethylene having a melt flow index of 0.1 to 50, as determined by ASTM D1238, Condition E.

20. The plastic bag of claim 15 in which said first layer is overlaid on both sides by said second layer.

21. The plastic bag of claim 15 which comprises a single first layer bonded to a single second layer.

* * * * *